UNITED STATES PATENT OFFICE.

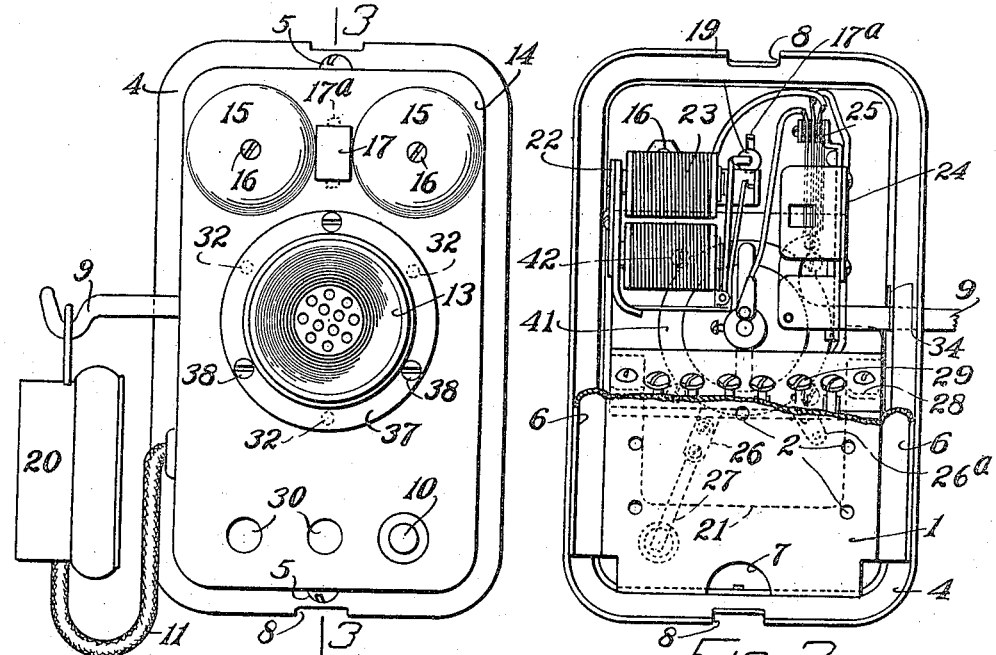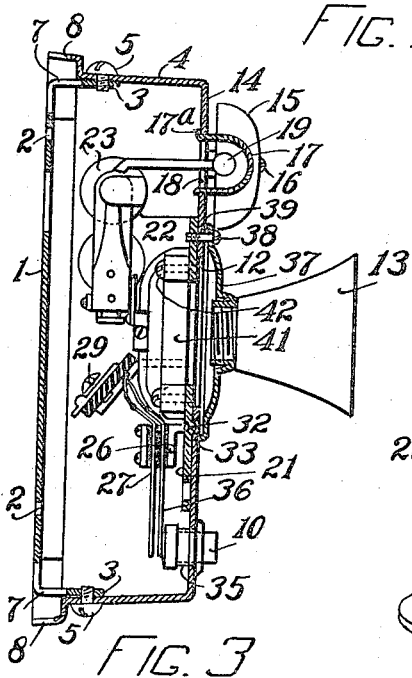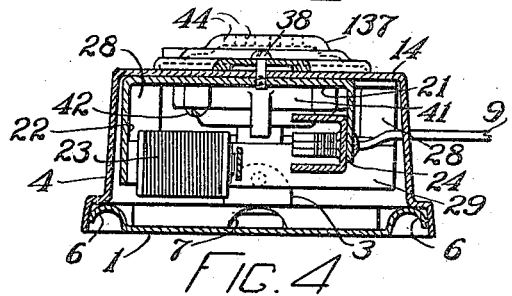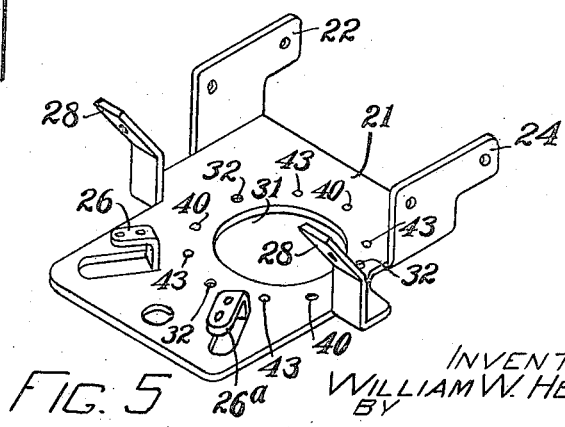

WILLIAM W. HENRY, OF WOLLASTON, MASSACHUSETTS, ASSIGNOR TO S. H. COUCH COMPANY, INC., OF ATLANTIC, MASSACHUSETTS, A CORPORATION OF MASSACHUSETTS.

TELEPHONE WALL SET.

1,240,974.  Specification of Letters Patent.  Patented Sept. 25, 1917.

Application filed August 18, 1915. Serial No. 46,053.

*To all whom it may concern:*

Be it known that I, WILLIAM W. HENRY, of Wollaston, a citizen of the United States, and residing at the above place, in the county of Norfolk and State of Massachusetts, have invented certain new and useful Improvements in Telephone Wall Sets, of which the following is a specification.

This invention relates to telephone wall-sets and has particular reference to the individual wall-set which constitutes the equipment at each end of a telephone line.

The object of the invention is to produce a wall-set which combines the elements of efficiency, neatness and cheapness, and to produce this result I have sought to follow throughout the unit system of assembly so that the labor of installing will involve merely ordinary skill.

The three primary units involved are, first, a wall-plate adapted for independent mounting, so that, during house construction, no ragged or unfinished places need be left in the walls to await the later installation of the telephones, as the necessary plates may be furnished to the builder and, later, the telephones may be quickly mounted on the plates set by the builder.

Second, a telephone box, preferably in one piece and adapted for quick assembly upon the prepared wall-plate.

Third, a base-plate adapted for the mounting thereon, as a unit, of the transmitter, bell-movement and the necessary switches so that the whole, independently assembled on the base-plate and properly connected, may be quickly secured within the box which is then ready for mounting upon the wall-plate.

In the accompanying drawings, which form part of this specification, and in which I have illustrated my invention as applied to house phones adaptable for inter-communicating systems,—

Figure 1 is a front view of the assembled wall-set.

Fig. 2 is a rear view of the same, with the wall-plate partly broken away.

Fig. 3 is a vertical section on line 3—3 of Fig. 1.

Fig. 4 is a cross section of a modification.

Fig. 5 is an isometric view of my preferred form of base-plate.

The wall-plate 1, preferably of pressed metal, is provided with a number of bolt-holes 2 so distributed over its surface that a proper number of them will always be available for fastening to the laths or studding, whatever may be the spacing of the latter. In Fig. 2, a double equipment of holes 2 is shown near the bottom of plate 1, the top being somewhat similarly equipped so that there is a variety of spacings suitable for wide or narrow laths.

At the ends of wall-plate 1 I provide ears 3 by which the box 4 is quickly assembled by screws 5.

At the sides of plate 1 I preferably form curved sockets 6 which furnish frictional guides for box 4, to avoid the necessity of depending entirely on screws 5 for the prevention of rattling. Ears 3 are also provided with openings 7 which register with openings 8 in box 4, these openings being adapted for outside wiring such as might be desirable where the telephone was not originally installed with the construction of the building, wall-plate 1 being, in that case, secured against the finished wall.

Box 4 is preferably formed in one piece of pressed or formed metal and is provided with suitable openings for the projection of the hook 9, the signaling button 10 and the cord 11, as well as a central opening 12 against which the mouth-piece 13 is secured. As the open side or top of box 4 is to face wall-plate 1, the bottom 14 forms the cover.

The bells 15 are suitably secured to the bottom 14 by screws 16; and a clapper-guard 17, secured by snapping the elastic ends 17ª within the opening 18, covers the clapper 19. An ordinary receiver 20 is attached to cord 11 and is adapted for suspension on hook 9, in the usual manner.

The base-plate 21 is preferably formed of metal, with integral ears struck up for the mounting of the actuating mechanism of the telephone, thus,—ear 22 is for the bell-movement 23, ear 24 for the hook 9 and talking switch 25, ear 26 for the signaling switch 27 and ears 28 for the terminal bank 29. In connection with these latter, it will be noticed that terminal bank 29 is equipped for inter-communicating service. For such service it would be necessary to provide a plurality of signaling buttons, so I form box 4 with a plurality of openings 30 adapted for the projection of such buttons, space being provided within box 4 for additional signaling switches, the ear 26ª being designed to mount one such. In the illustrated embodiment of my invention, these additional buttons are omitted as they are not necessary where private telephones are to be installed and, in fact, the extra holes 30 may be omitted from such boxes as are not to be used in inter-communicating systems; an important feature of this invention being the adaptability of my box for such various uses.

Base-plate 21 is provided with a near-central opening 31, adapted to register, when assembled, with opening 12 in box 4; and, adjacent to opening 31, I prefer to position a series of pilots 32 adapted to register with openings 33 in bottom 14, for the purpose of quick assembly.

From the foregoing, it will be noticed that base-plate 21, with all its parts assembled thereon as a unit, may be quickly positioned within box 4, the hook 9 passing through its slot 34, clapper 19 through its opening 18 and button 10, having first been positioned in bottom 14, is, after assembly held against its ferrule 35 by the spring 36 of switch 27.

To secure base-plate 21 in position I provide a cap 37 adapted to fit, outside of box 4, over opening 12, and a series of bolts 38, each adapted to pass through its opening 39 in bottom 14 and be threaded into its opening 40 in base-plate 21.

In this way but one fastening is needed for both mouthpiece 13 and base-plate 21 and, moreover, neither is fastened to box 4 although both are securely mounted against it, the former outside and the latter inside, as shown in the drawings.

The transmitter 41 is secured over opening 31 by bolts 42 which are adapted to thread into openings 43 in base-plate 21.

To separate the three units, screws 5 are first removed, thus releasing box 4, with base-plate 21, from wall-plate 1.

Then bolts 38 are unscrewed, thereby permitting the removal of base-plate 21, with its mountings intact.

Although, in Fig. 3, I show the cap 37 and mouth-piece 13 as separate parts, it will be understood that I do not limit myself to this construction as it is possible, and even preferable, to form both in one piece, as seen at 137 in Fig. 4, where the usual perforations 44 will permit the passage of voice currents.

Also, the various ears on base-plate 21 may be formed of separate pieces of metal and rigidly secured thereto.

What I claim is:—

1. In a telephone wall-set, a wall-plate adapted to be mounted against a wall or partition; a one-piece box adapted to be secured over said wall-plate so that its open side faces said wall-plate; means for so securing said box over said wall-plate; and a base-plate adapted for the mounting thereon of the bell-movement and transmitter; in combination with means for securing said base-plate against the bottom of and within said box.

2. In a telephone wall-set, a wall-plate; a box adapted to be secured against said wall-plate; means for so securing said box; and frictional guides adapted to prevent rattling of said box when so secured; in combination with a base-plate adapted for the mounting thereon of the transmitter and other mechanism; and means for securing said base-plate within said box.

3. A telephone box; a metallic base-plate with a suitable opening therethrough; means adapted for the mounting of a transmitter against said opening; and a plurality of bent ears, fast on said base-plate and adapted for the mounting thereon of suitable, independently-insulated telephone-actuating mechanisms; in combination with a mouth-piece for said transmitter; and independent, removable means for securing said base-plate and said mouth-piece together in operative position against said box.

4. A metallic base-plate with a suitable opening therethrough; means adapted for the mounting of a transmitter against said opening; and a plurality of metallic ears, fast on said base-plate and adapted for the mounting thereon of other telephone-actuating mechanism; in combination with removable means for so mounting said base-plate within a suitable telephone box as may operatively position said transmitter and said mechanism.

5. In a telephone wall-set, a terminal bank, a bell-movement, a transmitter, a talking switch and a signaling switch, all constituting telephone-actuating mechanisms; a metallic base-plate; independent means for mounting each of said mechanisms on said base-plate; and suitable means for independently insulating said switches and said bank; in combination with removable means for securing said base-plate within a suitable box.

In testimony whereof, I have affixed my signature in the presence of two witnesses.

WILLIAM W. HENRY.

Witnesses:
JOHN G. BESTGEN,
EMMA BESTGEN.

Copies of this patent may be obtained for five cents each, by addressing the "Commissioner of Patents, Washington, D. C."